United States Patent
Hays et al.

(10) Patent No.: US 6,878,187 B1
(45) Date of Patent: Apr. 12, 2005

(54) SEEDED GAS-LIQUID SEPARATOR AND PROCESS

(75) Inventors: Lance Hays, Tustin, CA (US); Ross Brown, Murrieta, GA (US); Ronald Franz, Rancho Santa Margarita, CA (US)

(73) Assignee: Energent Corporation, Santa Ana, CA (US)

( * ) Notice: Subject to any disclaimer, the term of this patent is extended or adjusted under 35 U.S.C. 154(b) by 111 days.

(21) Appl. No.: 10/424,897

(22) Filed: Apr. 29, 2003

(51) Int. Cl.⁷ ................................................. B01D 5/00
(52) U.S. Cl. .............................. 95/153; 95/217; 95/219; 95/226
(58) Field of Search .................... 95/153, 219, 226, 95/216, 217; 96/234, 323, 324, 355

(56) References Cited

U.S. PATENT DOCUMENTS

| | | | | |
|---|---|---|---|---|
| 3,894,851 A | * | 7/1975 | Gorman ........................ 95/219 |
| 4,059,419 A | * | 11/1977 | Ross ............................. 95/214 |
| 4,141,701 A | * | 2/1979 | Ewan et al. .................... 95/217 |
| 5,273,721 A | * | 12/1993 | Hallstrom ...................... 422/147 |
| 5,484,471 A | * | 1/1996 | Schwab ............................ 95/8 |
| 5,720,799 A | * | 2/1998 | Hays ............................ 96/177 |
| 6,090,299 A | * | 7/2000 | Hays et al. .................... 210/787 |
| 6,180,699 B1 | * | 1/2001 | Bakeev et al. ................. 524/104 |
| 6,592,654 B2 | * | 7/2003 | Brown .......................... 95/270 |

* cited by examiner

Primary Examiner—Frank M. Lawrence
(74) Attorney, Agent, or Firm—William W. Haefliger

(57) ABSTRACT

A separation process, the steps that include: providing an expansion zone, flowing a gaseous fluid into and through the expansion zone, flowing a spray of liquid droplets into the expansion zone to mix with the gaseous fluid and produce nucleation sites, then expanding the flow of mixed gaseous fluid and liquid droplets to cause condensation of gas onto the liquid droplets, and then centrifuging liquid droplets into a separation layer.

20 Claims, 4 Drawing Sheets

SEEDED GAS-LIQUID SEPARATOR AND PROCESS

BACKGROUND OF THE INVENTION

This invention relates generally to separation of gas and liquid in a flow of a mixture of the gas and liquid; more particularly it concerns enhancing separation efficiency through provision for seeding of the flow.

Many processes in the production of natural gas and industrial gases require the dehydration of the gas and/or the lowering of the temperature (dewpoint) at which liquids form from a saturated gas. This is accomplished by an expansion to lower temperature followed by separation of the liquids that have formed.

In a turbo compressor, the separated gas is transferred from the external separator to a compressor, driven by the shaft of the turbo expander. The gas is then compressed for transfer in a pipeline, for example. The droplets formed during the expansion of a saturated gas are formed by spontaneous condensation as the temperature is lowered. The diameters of droplets thus formed is very small, typically less than one ten millionth of a meter (less than one tenth of a micron). As a result, the separator in conventional dehydration or dewpointing installation must be very large. Separation using centrifugal or compact cyclonic separators is also difficult because of the small size. There is need for method and apparatus producing efficient separators in smaller installations.

SUMMARY OF THE INVENTION

The distance required to separate liquid droplets from a high pressure gas stream for typical geometric and flow conditions can be decreased by more than three orders of magnitude if the droplet radius can be increased from 0.1 micron to 10 microns. The presence of nuclei, such as liquid or solid particles can be employed to initiate condensation and growth of condensation in an expanding gas. The resulting size of the formed droplets is determined by the size of the nuclei and the liquid condensate formed on each.

A major object of the invention is to introduce liquid droplets at the start of the expansion of a saturated vapor (or of a gas having saturated vapor as constituents) to cause the resulting condensate droplets to have a large enough size to facilitate separation from the gas. This objective is met in a separation process that includes a) providing an expansion zone,
b) flowing a gaseous fluid into and through said expansion zone,
c) flowing a spray of liquid droplets into the expansion zone to mix with the fluid and produce nucleation sites,
d) then expanding the flow of mixed gaseous fluid and liquid droplets to cause condensation of gas onto the liquid droplets,
e) and then centrifuging liquid droplets into a separation layer.

Another objective is to introduce methanol, glycol or another hydrate inhibiting agent in the form of liquid droplets at the start of the expansion for the purpose above and to prevent hydrate formation in the cooled, separated liquid.

Another objective is to impinge the resulting flow of gas and liquid droplets generally tangentially on a contained, rotating liquid layer to produce separation.

A further object is to impinge the flow of gas and liquid droplets onto a contained rotating liquid layer, to produce separation of liquid and gas.

An added object is to provide for atomizing the liquid in an atomizer to produce said spray; and to provide a nozzle through which the flow passes and expands producing a swirling flow.

A yet further object is to provide a generally cylindrical wall such as a rotor having an inward facing surface onto which separated liquid collects, there being a passage in the wall via which collected liquid exits. As will be seen, the collected liquid surface typically rotates at velocity nearly the same as the tangential velocity of the flow approaching the surface, whereby high separation efficiency is achieved.

It is a unique and unexpected result of the invention that by introducing more liquid into a separation process, the separation of liquid in the process is improved rather than worsened. It is also believed unique and unexpected that by purposely allowing an increase in the amount of liquid in the separation surface the separation of liquid and energy recovery is improved rather than worsened. Neither of these results would likely be anticipated by those versed in the field of gas-liquid separation.

These and other objects and advantages of the invention, as well as the details of an illustrative embodiment, will be more fully understood from the following specification and drawings, in which:

DRAWING DESCRIPTION

DETAILED DESCRIPTION

Figure 1:
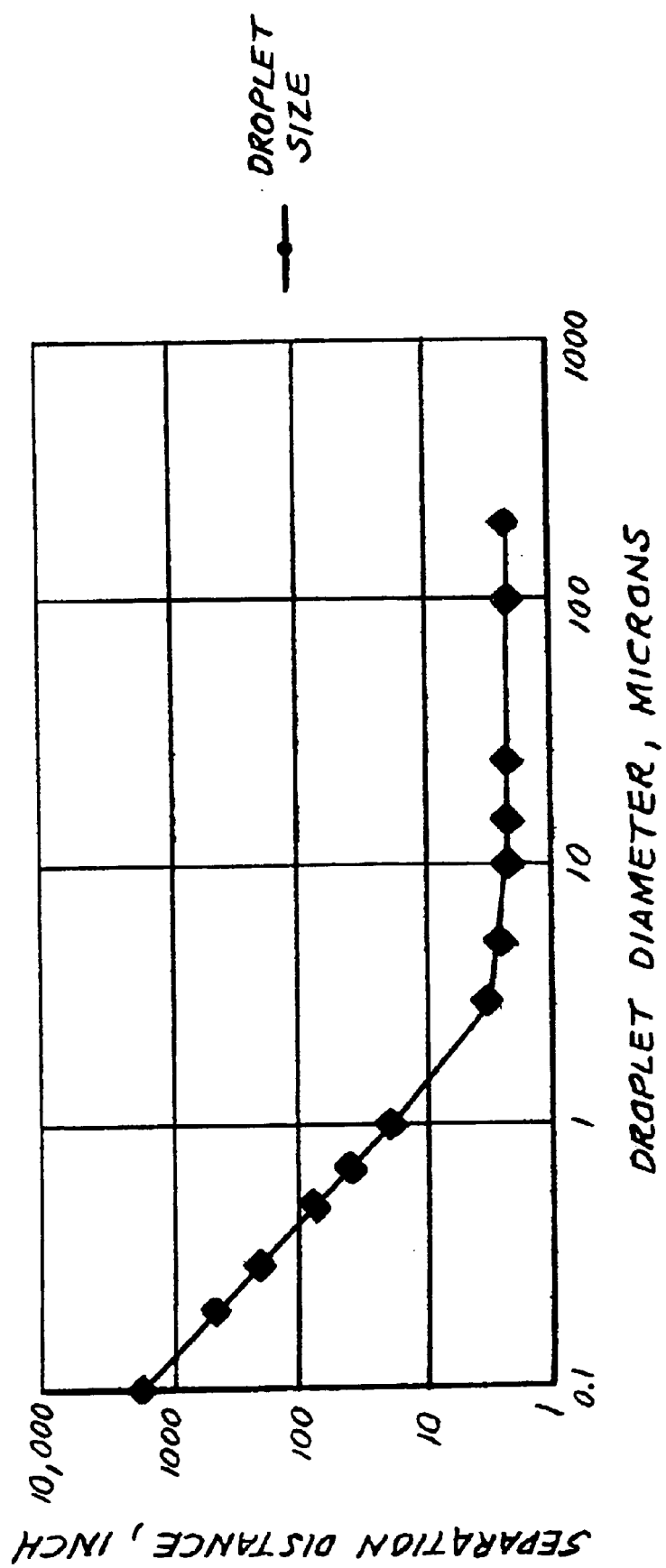
FIG. 1 is a graph.
Figure 2:
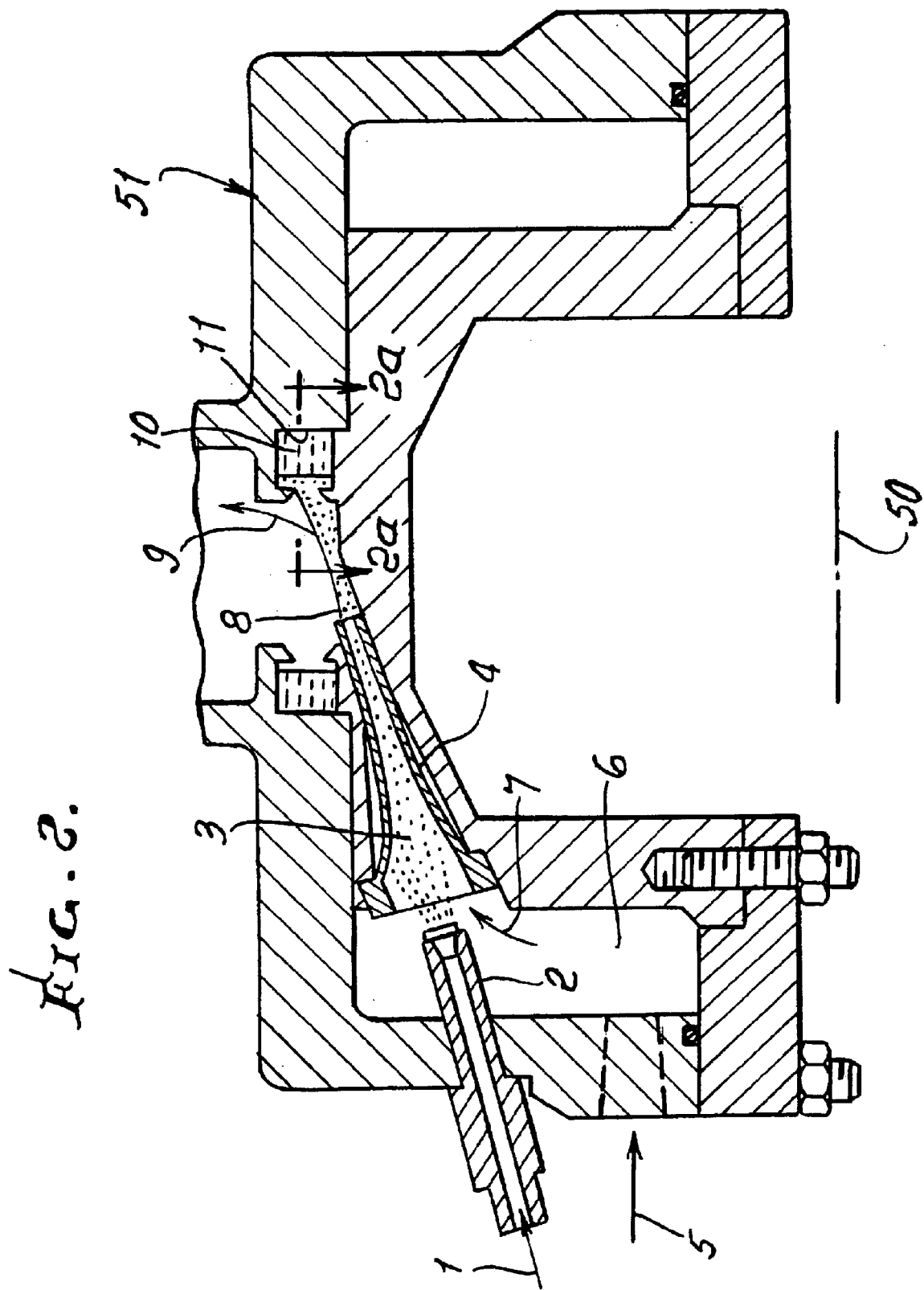
FIG. 2 is a section showing operation of an expansion nozzle, separator, and a portion of a rotor.
Figure 2A:
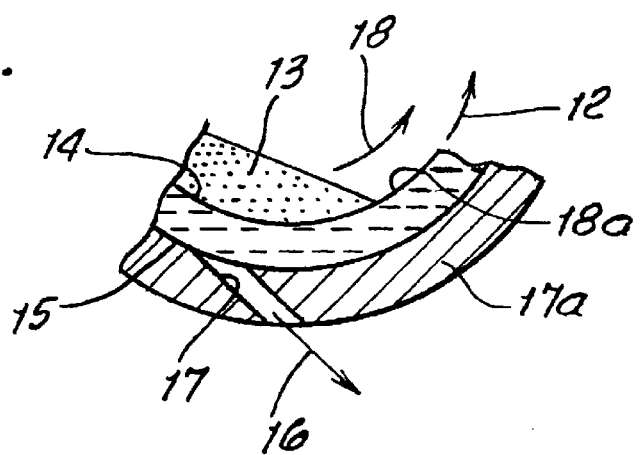
FIG. 2a is a fragmentary section taken on lines 2a—2a of FIG. 2.

The introduction of liquid droplets to provide nucleation sites in an expansion is shown in FIG. 2. This is the preferred separator. Liquid 1 is introduced to an atomizer 2. The atomizer provides a spray of droplets 3 into an expansion nozzle 4. Gas or a mixture of gas and liquid 5 flows into a manifold 6. The gas then flows at 7 into the expansion nozzle, mixing with the injected liquid droplets.

The gas is expanded to a lower pressure in the nozzle causing gaseous components to condense on the injected liquid droplets. At the exit of the nozzle a high velocity stream 8 of gas and injected droplets which contain condensed gaseous components leaves the nozzle producing a swirling flow 9, i.e. swirling about axis 50. The liquid droplets are centrifuged into a layer of liquid 10 on the wall 11 of a separator 51. The tangential force causes the surface of the liquid layer to rotate with a velocity (see arrow 12), nearly equal to the tangential velocity of the gas and droplet stream 13.

The centrifugal force in the swirling liquid layer causes an increase in the liquid pressure from the layer surface 14 to the outer radius 15 at the rotor inner surface. The pressure increase is:

$$\Delta p = \int (\rho V^2/r) dr$$

Where:
Δp=pressure increase from the surface to outer radius
ρ=liquid density
V=liquid velocity at a radius r
R=radius from separator centerline
And where:
The integral is taken from the radius at the surface 14, to the radius at the wall at 15.

The separated liquid 16 is removed from the liquid layer through a passage 17 in separator rotor 17a. The separated gas at 18 is forced from the liquid and gas stream by the liquid layer, and removed from the separation region.

The wall of the liquid layer has a reversing surface at 18a, to re-direct any splash or reverse flow from the liquid layer into the high velocity stream and hence onto the liquid layer.

Figure 3:
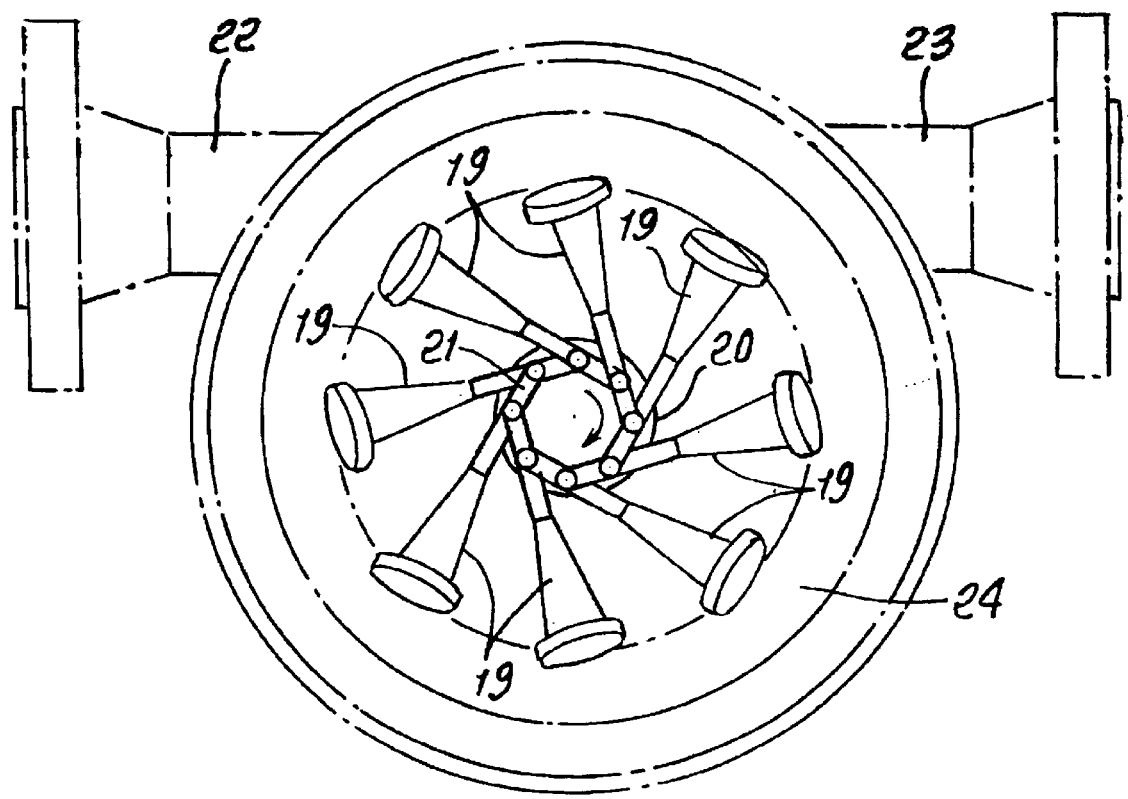
FIG. 3 is an axial view of one form of apparatus embodying the invention.

A preferred arrangement of multiple expansion nozzles 19 is shown in FIG. 3, an end view of the separator. The nozzles are oriented in a tangential position relative to the separation wall 20. The intersection of the flow from the nozzles with a perpendicular plane at the nozzle exits 21 produces a nearly full flow admission into the surface and annulus defining the boundary of the flow zone. The gas inlet 22 and the gas manifold annulus 24, providing flow to the nozzles are shown. See also 6 in FIG. 2. The gas exit 23 is also shown.

Figure 4:
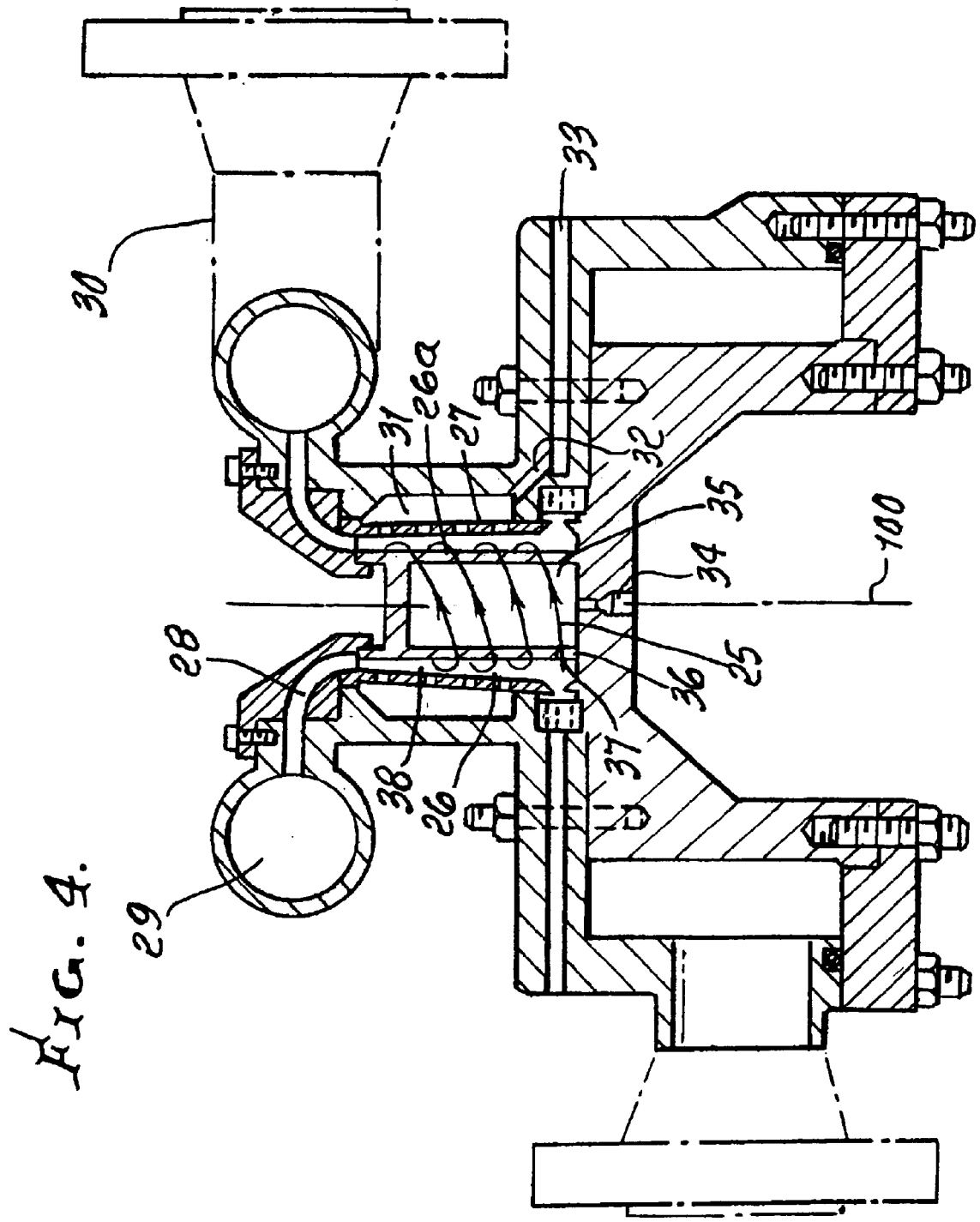
FIG. 4 is a section taken through the separator.

Another section through the separator is shown in FIG. 4. The separated gas 25 follows a helical path in the annular space 26, between walls 26a and 27 resulting in a vortex. The gas vortex centrifuges any remaining liquid at 38 onto the outer cylindrical wall 27. The gas vortex flows into an annular diffuser space 28, moving in a radially outward direction, that is, away from vortex axis 100. The increased area and reduction in angular momentum result in an increase in the pressure of the gas. The pressurized dry gas flows into a volute 29 and leaves through a passage in pipe 30.

The outer wall of the annulus 27 can be perforated or porous. In this case, the droplets separated in the annulus and some of the gas flow through the outer wall 27 into another annular space 31. The gas and liquid mixture flows from the annular space 31 through a passage 32. The exit 33 of the passage 32 is connected to a passage 34. The passage 34 directs the mixture to a chamber 35 which is inside the annulus 26, chamber 35 bounded by wall 26a. The mixture subsequently is re-circulated outwardly through a passage 36, to the inner boundary at 37 of the gas vortex 25. The mixture is circulated as a result of the naturally occurring pressure difference between the outer wall of the vortex and the inner wall of the vortex.

In another variation the outer wall 27 is solid. In this case the remaining liquid 38 is re-entrained by the gas flowing in the radial outward direction and is re-evaporated as the gas pressure and temperature are increased in the annular diffuser space 28.

We claim:
1. In a separation process, the steps that include:
   a) providing an expansion zone,
   b) flowing a gaseous fluid into and through said expansion zone,
   c) flowing a spray of only liquid droplets into the expansion zone to mix with said fluid and produce nucleation sites, free of particulate,
   d) then expanding the flow of mixed gaseous fluid and liquid droplets in nozzle means to cause condensation of gas onto the liquid droplets, enlarging the sizes thereof,
   e) and then centrifuging the enlarged liquid droplets into a separation layer,
   f) said b) and c) flowing steps being free of solid particulate, in said fluid and in said spray.
2. The method of claim 1 including impinging the flow of gas and liquid droplets onto a contained rotating liquid layer, to produce separation of liquid and gas.
3. The method of claim 1 including atomizing the liquid in an atomizer to produce said spray.
4. The method of claim 1 including directing the nozzle or nozzles to produce swirling flow.
5. The method of claim 1 wherein gas separates from the centrifuged liquid, and is removed.
6. The method of claim 1 including providing a generally cylindrical wall having an inward facing surface onto which centrifuged liquid collects, there being a passage in the wall via which collected liquid exits.
7. The method of claim 6 wherein said collected liquid surface rotates at velocity nearly the same as the tangential velocity of the flow approaching said inward facing surface.
8. The method of claim 6 wherein some of the centrifuged liquid has a return flow into the flow of said gas and liquid approaching the generally cylindrical wall.
9. The method of claim 6 including providing multiple flow passing nozzles spaced about the axis of rotation of said surface, there being a passage in the wall via which collected liquid exits, the flow from the nozzles directed approximately tangentially to the liquid layer collecting on said surface.
10. The method of claim 1 wherein said liquid is selected from the group:
   i) methanol
   ii) glycol
   iii) hydrate inhibiting substance.
11. A method of separating liquid from a flow of mixed gas and liquid free of particulate, that includes expanding the gas in a nozzle or nozzles and introducing liquid nuclei free of particulate into the expanding gas to produce condensed liquid droplets larger than those produced by spontaneous condensation in order to effectuate separation of condensed liquid from the gas and then centrifuqinq the condensed liquid droplets into a separation layer.
12. The method of claim 11 where the liquid nuclei are selected from the group: methanol, glycol, or another substance to inhibit hydrate formation.
13. The method of claim 1 where the flow of gas and liquid is expanded in a nozzle to lower the pressure and temperature to produce condensation and a high velocity jet.
14. A method of separating a mixture of gas and liquid that includes impinging a high velocity jet of said mixture at a tangential angle onto a contained, moving liquid layer, thereby centrifugally separating liquid from the mixture with momentum transfer from the moving liquid and gas to the separated liquid layer, whereby pressure of the separated liquid is increased, said moving liquid and gas being entirely free of solid particulate.

15. The method of claim 14 wherein the pressure of the separated liquid is increased by centrifugal force in the moving liquid layer.

16. The method of claim 14 where a rotating curved re-directing surface is provided circulate acting to cause re-circulation of splash or backflow into the separated liquid.

17. The method of claim 14 including providing a passage wherein the separated liquid is removed from the liquid layer at a radius larger than the radius at the point of impingement of the mixture on the liquid layer.

18. The method of claim 14 including means for causing separated gas to flow as a vortex into an annular diffuser, to recover pressure.

19. The method of claim 18 including providing an outer porous wall acting by capillary effect to remove additional liquid separated from the gas.

20. The method of claim 19 including providing means for re-circulating the additional liquid separated from the gas into the high velocity jet by the pressure difference between the outer wall of the vortex and the inner wall of the vortex.

* * * * *